United States Patent [19]
Camps et al.

[11] Patent Number: 5,632,359
[45] Date of Patent: May 27, 1997

[54] DISK BRAKE WITH STROKE INDICATOR

[75] Inventors: Josep O. Camps; Juan S. Bacardit, both of Drancy, France

[73] Assignee: Bendix Espana S.A., Barcelone, Spain

[21] Appl. No.: 387,770

[22] PCT Filed: Dec. 22, 1994

[86] PCT No.: PCT/FR94/01524

§ 371 Date: Feb. 21, 1995

§ 102(e) Date: Feb. 21, 1995

[87] PCT Pub. No.: WO95/20109

PCT Pub. Date: Jul. 27, 1995

[30] Foreign Application Priority Data

Jan. 19, 1994 [FR] France .................................. 94 00547

[51] Int. Cl.[6] ................................................ F16D 66/02
[52] U.S. Cl. ...................................... 188/1.11; 188/71.7
[58] Field of Search ........................... 188/1.11 R, 1.11 E, 188/1.11 WE, 71.7

[56] References Cited

U.S. PATENT DOCUMENTS 3,802,257  4/1974  Jorenda et al. .................. 188/1.11 WE
4,374,375  2/1983  Allori et al. .................... 188/1.11 WE

FOREIGN PATENT DOCUMENTS

| 168303 | 1/1988 | European Pat. Off. | ....... 188/1.11 WE |
|---|---|---|---|
| 587155 | 10/1993 | European Pat. Off. | ....... 188/1.11 WE |
| 2743868 | 4/1978 | Germany | ....... 188/1.11 WE |
| 3903306 | 8/1990 | Germany | ....... 188/1.11 WE |
| 4010213 | 10/1991 | Germany | ....... 188/1.11 WE |
| 9111351 | 8/1991 | WIPO | ....... 188/1.11 E |

*Primary Examiner*—Matthew C. Graham
*Attorney, Agent, or Firm*—Leo H. McCormick, Jr.

[57] ABSTRACT

A wear indicator for a disk brake having a caliper that slides in a carrier to apply friction pads against a disk. The wear indicator comprises a continuous variation sensor, such as a capacitive sensor, connected to a monitor. The capactive sensor has first and second electrodes having a variable overlap area. A guide pin for the caliper forms the first electrode. As the guide pin moves during a brake application, the monitor periodically measures the overlap area to define a current operational output signal which is compared with a predetermined signal and when the comparison differs from a normal result a failure signal is provided to indicate that the disk brake in not properly operating.

3 Claims, 5 Drawing Sheets

DISK BRAKE WITH STROKE INDICATOR

The present invention relates to a disk brake for a motor vehicle, comprising:

two brake elements which can move with respect to one another, one of which is a caliper straddling a brake disk, and the other of which is a carrier fixed to the vehicle;

braking means comprising a cylinder secured to the caliper and, facing the disk, having an opening which is closed by a piston;

guide means allowing the caliper to slide with respect to the carrier when the braking means are actuated, these guide means comprising at least one guide pin fitted to one of the brake elements, and a bore formed in the other brake element and in which the guide pin slides;

two friction pads, the first of which is located between the piston and a first face of the disk, and the second of which is located between a second face of the disk and a jaw of the caliper, these pads being applied to the disk when the clamping means are actuated; and at least one electrical wear indicator for monitoring the state of wear of at least one of the pads, this indicator including two parts at least one of which is displaced with respect to the other when the braking means are actuated, and comprising means for varying an electrical parameter, substantially continuously, as a function of the relative position occupied by the first and second parts of this indicator.

A brake of this type is illustrated, for example, by documents FR-A-2,485,132 and EP-A-0,168,303.

In practice, essentially three types of wear indicators are known today, namely electrical indicators connected to the pads, acoustic indicators also connected to the pads, and electrical indicators, such as the one which the previously mentioned documents describe, which are provided on the brake itself.

Whatever its embodiment, such a wear indicator is subject to a high risk of failure, stemming from the very hostile nature of the environment in which it must work.

Under these conditions, there is always a non-negligible risk that even substantial wear of the brake pads might not be indicated by any signal despite the presence of a wear indicator, it always being possible for the latter to have broken down.

What is more, a wear indicator like the one described in document EP-A-0,168,303 assumes the use of coils and of magnetically appropriate materials which have an overall size and additional cost which are not negligible.

The present invention is located in this context and its object is to propose a disk brake in which the risk of significant wear of the pads passing unnoticed is substantially reduced, but without being subject to substantial constraints in terms of cost and overall size.

To this end, the brake of the invention is essentially characterized in that the wear indicator comprises a capacitive sensor having two electrodes, each of the parts of this indicator constituting a corresponding electrode of this sensor, in that one of the electrodes of the capacitive sensor is mounted so that it can slide in the other, these electrodes participating in forming said guide means and having a variable overlap area, and in that this brake further comprises monitoring means capable of periodically measuring the electrical parameter, of comparing its value to at least one predetermined threshold, and of delivering a failure signal when the result of the comparison differs from a previously recorded normal result.

The monitoring means advantageously comprise an electronic circuit which is sensitive to the capacitance between the two electrodes, secured to one of the parts of the indicator and capable of producing, as an output signal, a signal which is modulated over time as a function of the value of the capacitance formed between the electrodes of the sensor.

In a very effective embodiment, the electronic circuit produces, as an output signal, a modulation of an electrical energy signal which it receives coming from a power source.

Moreover, one of the electrodes of the wear indicator may, for example, comprise the guide pin or an axial electrode secured to the cylinder, the other electrode comprising, in this latter case, a sleeve secured to the piston.

Other features and advantages of the invention will serge clearly from the description thereof which is given hereafter, by way of indication and with no limitation implied, with reference to the appended drawings in which:

DETAILED DESCRIPTION OF DRAWINGS

Figure 1:
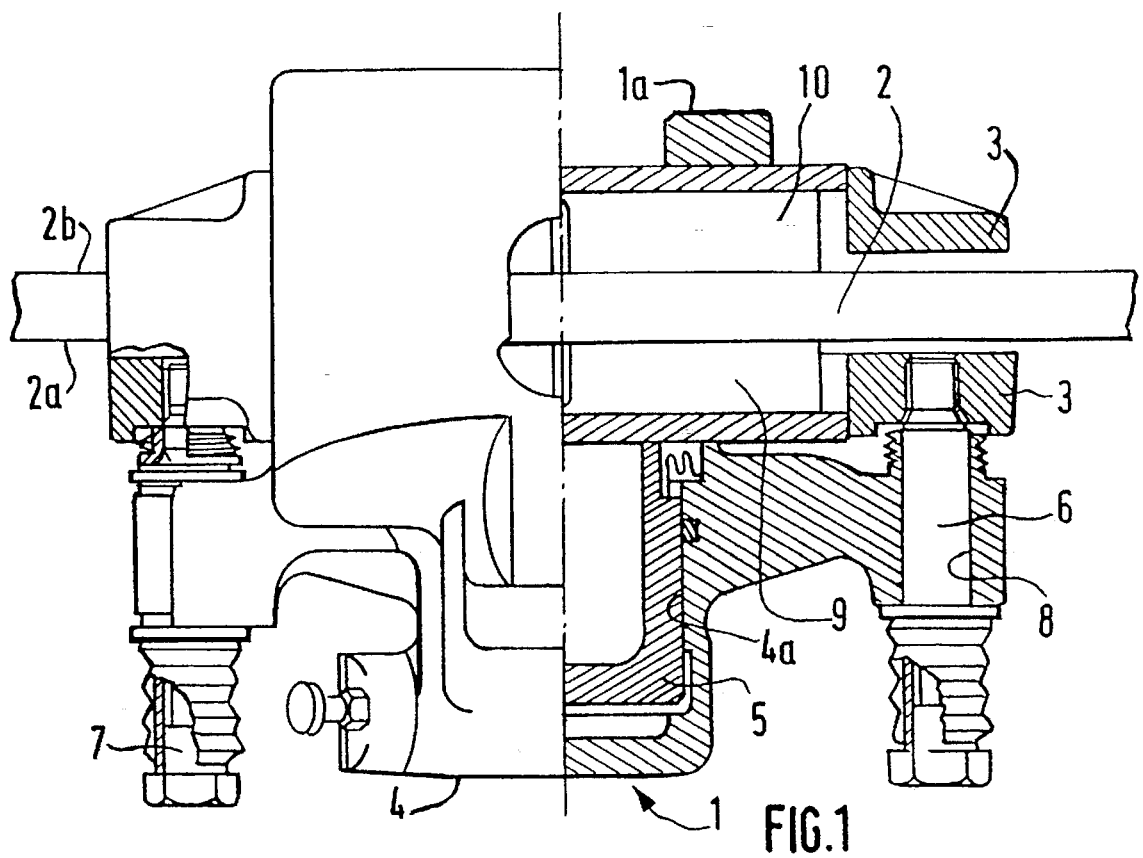
FIG. 1 is a partial sectional view of a conventional disk brake.

As shown in FIG. 1, the present invention essentially relates to a disk brake for a motor vehicle, comprising:

two brake elements which can move with respect to one another, one of which is a caliper 1 straddling a brake disk 2, and the other of which is a carrier 3 fixed to the vehicle;

braking means comprising a cylinder 4 secured to the caliper 1 and, facing the disk, having an opening 4a which is closed by a piston 5;

guide means allowing the caliper to slide with respect to the carrier when the clamping means are actuated, these guide means comprising at least one guide pin, such as 6 and 7, fitted to one of the brake elements, and a bore 8 formed in the other brake element and in which the guide pin 6 slides; and two friction pads 9, 10, the first of which 9 is located between the piston 5 and a first face 2a of the disk, and the second of which 10 is located between a second face 2b of the disk and a jaw 1a of the caliper, these pads being applied to the disk when the braking means are actuated.

The object of the invention is to give such a brake an electrical wear indicator allowing the state of wear of at least one of the pads to be monitored, and this being with great operational safety.

Overall, the wear indicator includes, in a way known per se, two parts, at least one of which is displaced with respect to the other when the means for braking the brake are actuated, this wear indicator comprising means for varying an electrical parameter, substantially continuously, as a function of the relative position occupied by the first and second parts of this indicator.

According to the invention, illustrated in FIGS. 2 to 8, the wear indicator comprises a capacitive sensor with two electrodes, each of the parts of this indicator constituting a corresponding electrode of this sensor.

Figure 2:
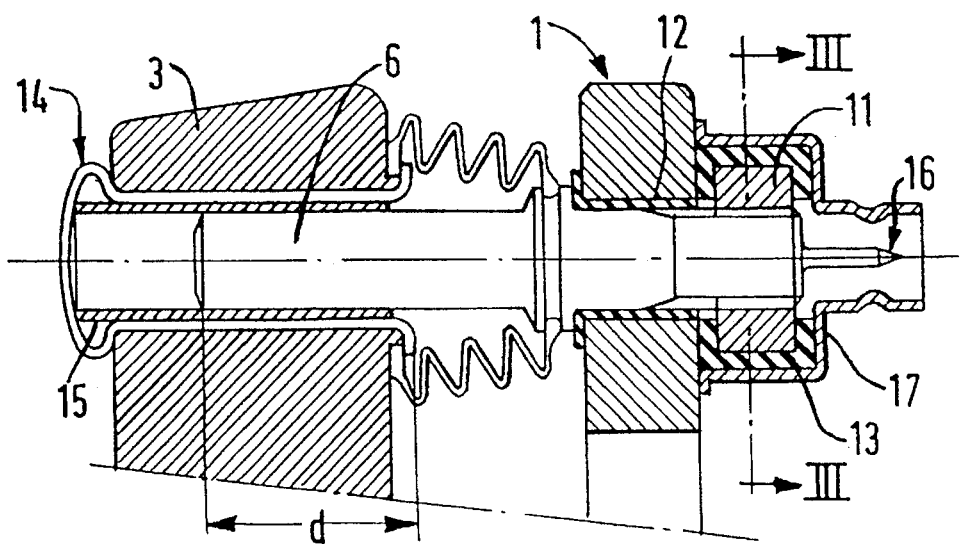
FIG. 2 is a sectional view of a capacitive sensor which can be used in a brake in accordance with the invention.
Figure 3:
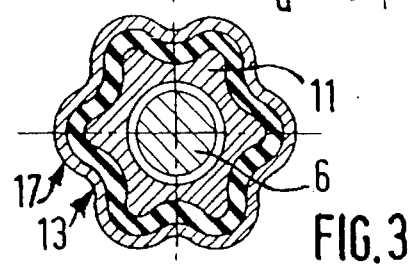
FIG. 3 is a sectional view along the line III—III of FIG. 2.

As shown in FIG. 2, a first electrode of this sensor may essentially consist of the guide pin 6, represented in this figure as being secured to the caliper 1 by means of a nut 11, whilst having galvanic isolation from this caliper by means of an isolating sheath 12 and an isolating component 13 surrounding the nut 11.

The guide pin slides for example in a guide sleeve 14 which is inserted into the carrier 3, this sleeve 14 and the guide pin 6 being isolated from one another by virtue of a second isolating sheath 15.

Moreover, a first electrical contact 16 capable of being connected to a variable potential source is connected to the guide pin 6, and a second contact 17 is galvanically connected, through the use of the caliper 1, to the carrier 3 which constitutes the second electrode of the capacitive sensor and is connected to the earth potential of the vehicle.

Under these conditions, and as the person skilled in the art will easily understand from reading the present description, interpreted by means of the drawings, the electrical capacitance which can be observed between the contacts 16 and 17 comprises a capacitance of fixed value formed by mounting the guide pin on the caliper 1, and a capacitance of variable value depending on the overlap length d between the guide pin 6 and the carrier 3.

Consequently, a specific value of the capacitance which can be observed between the contacts 16 and 17 corresponds to each relative position of the carrier and of the guide pin, therefore to each relative position of the carrier and of the caliper, this value varying continuously during the relative displacement of the carrier and the caliper.

The wear indicator of the invention moreover comprises monitoring means which will be detailed later, and which are capable periodically of measuring the capacitance between the contacts 16 and 17, of comparing its value to at least one predetermined threshold, and of delivering a failure signal when the result of the comparison is different from a previously recorded normal result.

Figure 4:
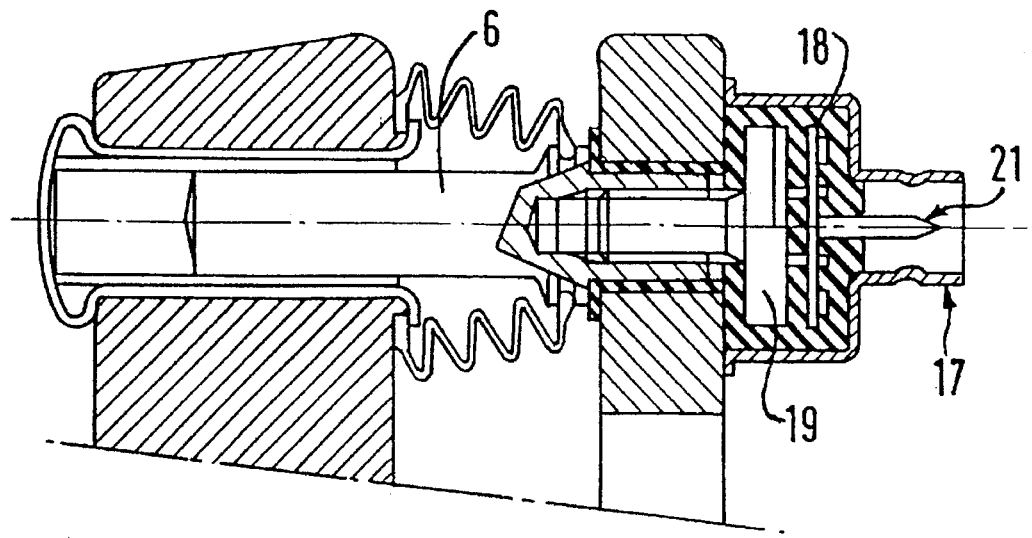
FIG. 4 is a sectional view similar to FIG. 2.

These monitoring means comprise, in the embodiment of FIG. 4, an electronic circuit 18 which is sensitive to the capacitance between the two electrodes, secured to one of the parts of the wear indicator, and capable of producing, as an output signal, a signal which is modulated over time as a function of the value of the capacitance formed between the electrodes of the sensor.

In effect, although it is completely possible to implement the invention according to the embodiment of FIG. 2, this is made tricky by the existence of parasitic capacitances which are introduced particularly by the conductors intended to connect the contacts 16 and 17 to the monitoring means.

It is therefore preferable to measure the capacitance between the contacts 16 and 17 in situ as shown in FIG. 4, in which the electronic circuit 18 is mechanically secured to the guide pin 6 through the use of the screw 19, this circuit having a measurement terminal 20 (FIG. 8) galvanically connected to this guide pin, an active potential terminal connected to the central contact 21, and an earth terminal connected to the contact 17.

Figure 8:
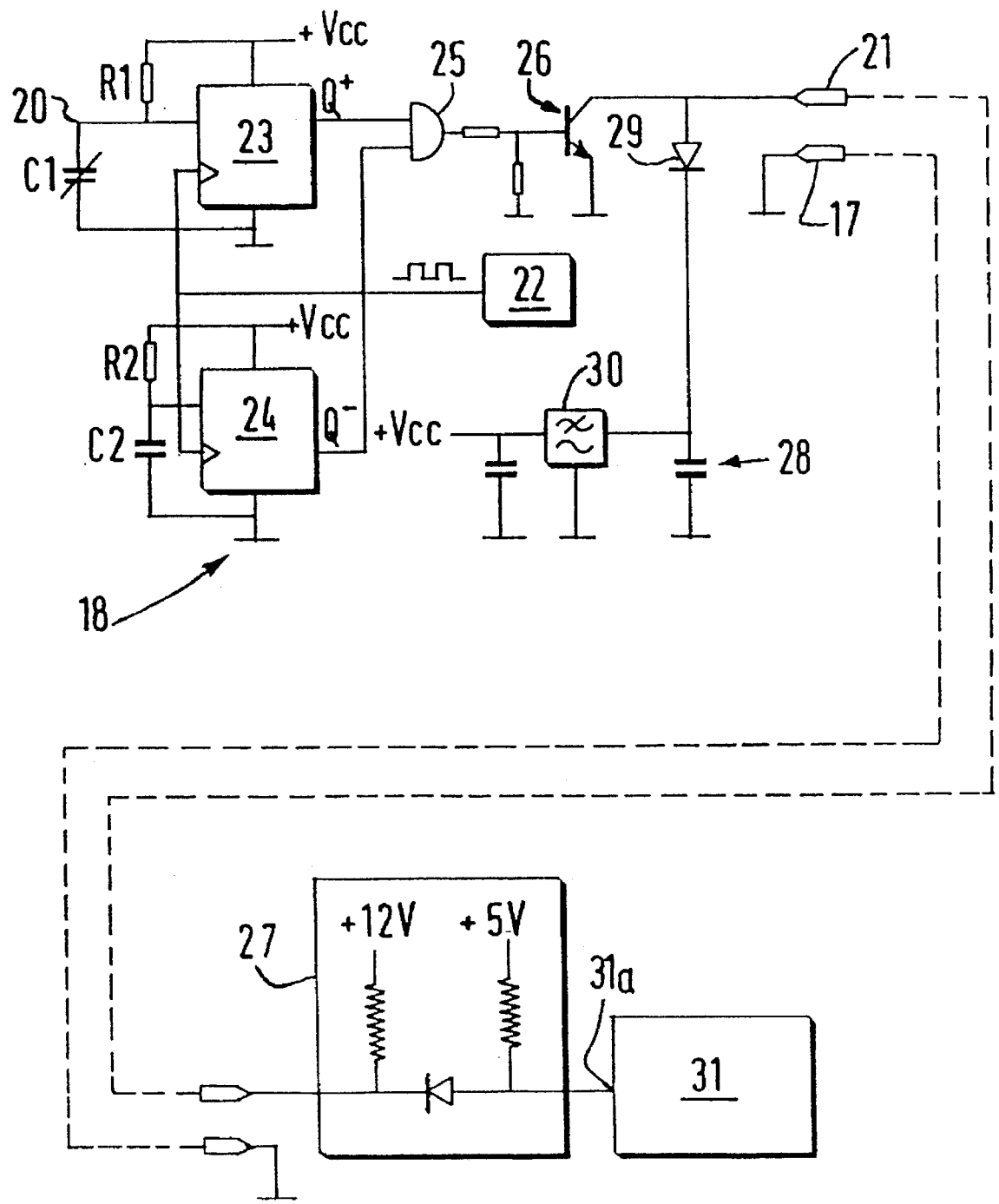
FIG. 8 is the diagram of an electronic circuit which can be used for implementing the invention.

FIG. 8 illustrates, in its upper part, a possible diagram for the electronic circuit 18.

Figure 9:
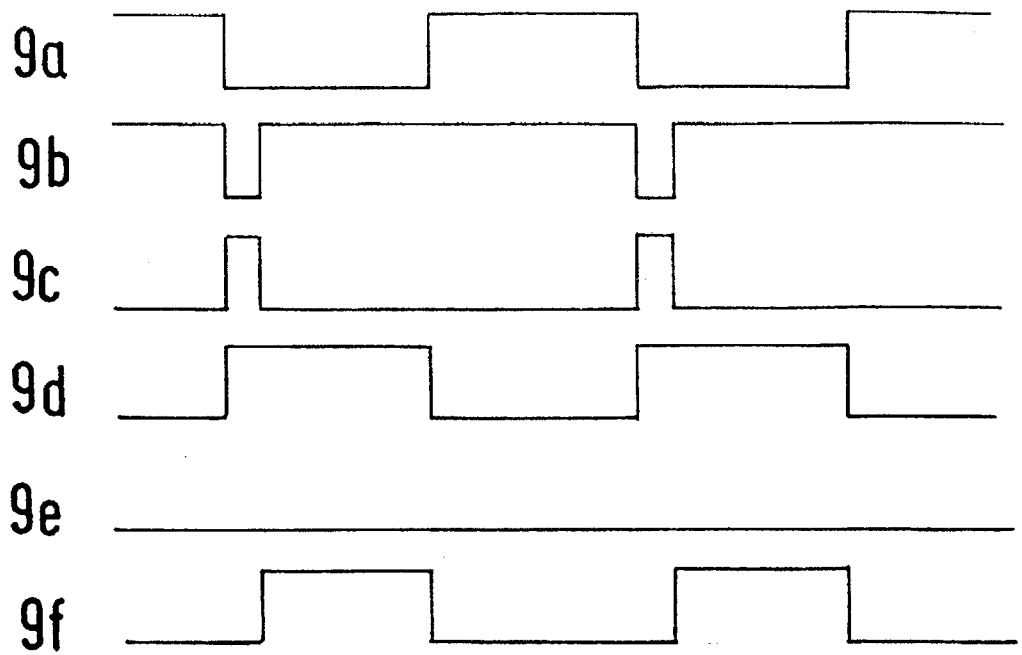
FIG. 9, formed of FIGS. 9a to 9f, represents wave forms which can be observed at various points of the circuit of FIG. 8.
Figure 10:
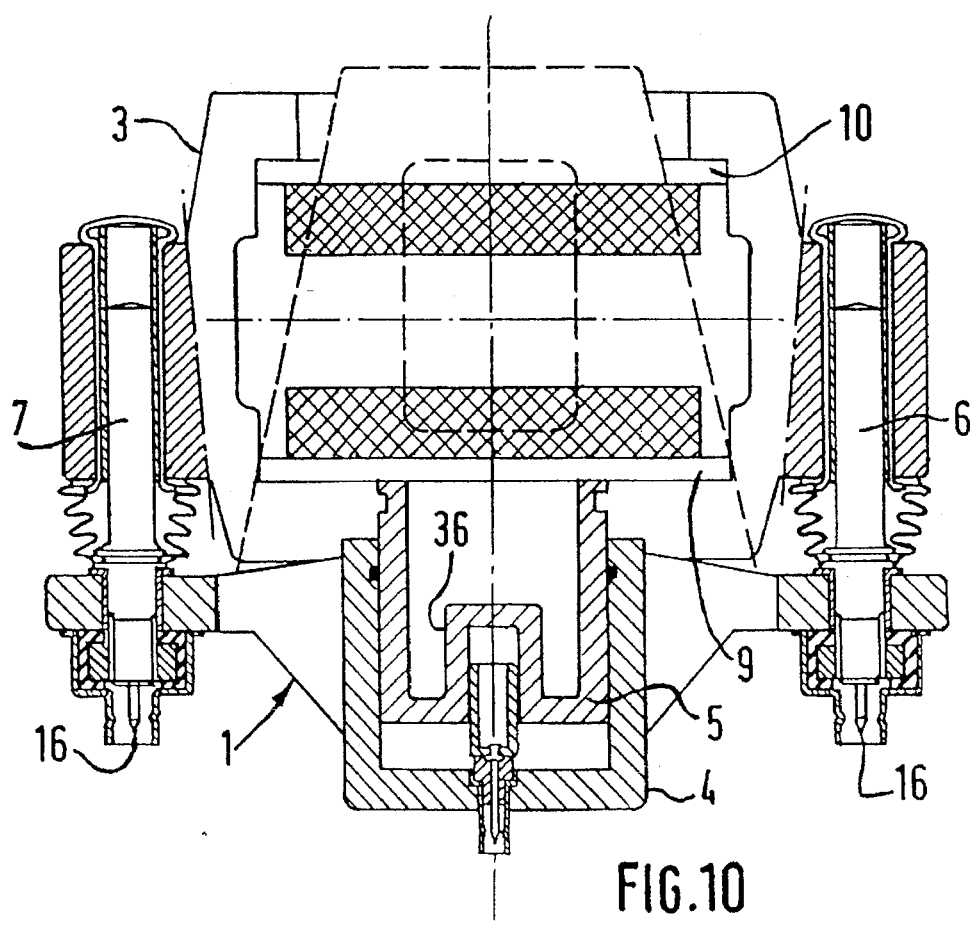
FIG. 10 is a view in plan and partial section of a brake in accordance with the invention.

The latter essentially comprises an oscillator 22 delivering a symmetrical pulsed signal visible in FIG. 9a to two monostable multivibrators 23 and 24.

These multivibrators are respectively connected to resistors R1 and R2 and to capacitances C1 and C2, the capacitance C1 being that of the previously described capacitive sensor, and the capacitor C2 being a reference capacitor.

Under these conditions, the multivibrators 23 and 24 deliver on their respective outputs Q+ and Q− signals which are modulated as a function of time, the pulses produced by the multivabrator 23 having a duration which represents the value of the capacitance C1 and the pulses produced by the multivibrator 24 serving as a reference and making it possible to be rid particularly of the existence of parasitic capacitances and drifts in the electronic components as a function of time or of temperature.

More precisely, the signal produced by the multivibrator 24 is represented in FIG. 9b, whereas FIG. 9c illustrates the signal produced by the multivibrator 23 when the capacitance C1 is minimal, and FIG. 9d illustrates the signal produced by the multivibrator 23 when the capacitance C1 is maximal.

The output signals from the multivibrators 23 and 24 are combined by the logic AND gate 25, which delivers an output signal represented in FIG. 9e for input signals corresponding to those of FIGS. 9b and 9c, and an output signal represented in FIG. 9f for input signals corresponding to those of FIGS. 9b and 9d.

The output signal from the gate 25 is delivered to the transistor 26 whose function is to short-circuit the terminals 21 and 17 when it is activated.

As shown moreover in FIG. 8, these terminals 21 and 17 are connected to a DC electrical power supply 27, this power therefore being modulated as a function of time by the transistor 26.

The energy received by the circuit 18 coming from the source 27 is stored by the circuit 18 in an input capacitor 28 through a diode 29, the capacitor 28 being connected to a low-pass filter 30 tasked with delivering a regulated voltage Vcc to the components of the circuit 18.

As FIG. 8 again shows, the monitoring means also comprise a microprocessor 31, or any other equivalent means, for making use of the information which is carried by the variable value of the capacitance C1.

In this case, the microprocessor 31 includes an input 31a connected to the source of electrical power 27, the latter including a diode connected between two voltage sources in order to solve a possible problem of level matching on the input 31a.

By virtue of this assembly, the microprocessor is in a position to receive the output signal from the AND gate 25, periodically to evaluate the duration thereof by comparing it to that of its internal clock, and to deduce therefrom, for example by consulting a correspondence table which has previously been stored in memory, the value of the capacitance C1 or the relative position of the guide pin 6 and of the caliper.

Under these conditions, the microprocessor 31 can easily compare the measured value of the capacitance C1 to minimal and maximal values corresponding to authorized normal operating limits, so as to be able to deliver a failure signal when the result of the comparison shows that the measured value is outside the limiting values.

It is, however, equally possible to store in memory, in step with their acquisition, the lowest measured values of the capacitance C1, for example to supply to the driver of the vehicle, by extrapolation of the measured values, an indication of the future need to change the friction pads.

In the event of a breakdown of the capacitive sensor, for example due to a short-circuit between the guide pin and the caliper, the capacitance measured by the microprocessor 31 shows an erroneous value, so that the microprocessor is still in a position to deliver a failure signal.

Figure 5:
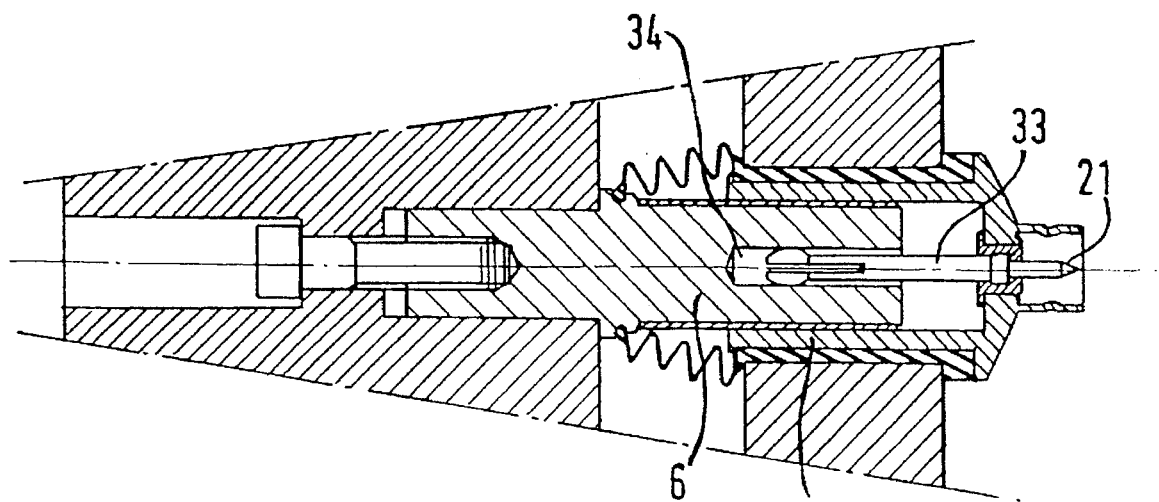
FIG. 5 is a sectional view similar to FIG. 2.

FIG. 5 shows one of the possible embodiment variants of the capacitive sensor, in which the variable capacitance is produced by the guide pin 6 on the one hand, and by a conductive sleeve 32 on the other hand, each of these elements being galvanically isolated from the other and from the rest of the brake, and the active contact 21 being connected to the guide pin by virtue of an elastic conductive pin 33 sliding in an axial bore 34 of this guide pin.

Figure 6:
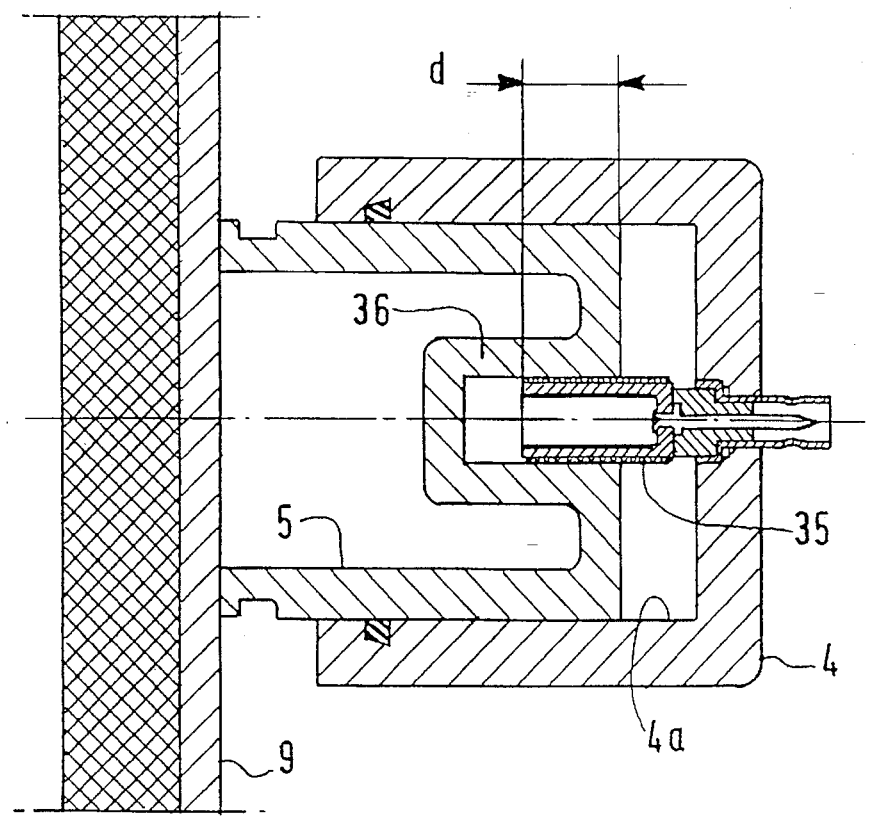
FIG. 6 is a partial sectional view of a brake in accordance with another embodiment of the invention.

FIG. 6 shows another possible embodiment variant of the capacitive sensor, which can be used simultaneously with those of FIGS. 4 and 5 and in which one of the electrodes of the capacitive sensor comprises an axial electrode 35 secured to the cylinder 4, whereas the other electrode comprises a sleeve 36 secured to the piston 5, for example formed by the latter and guided along the axial electrode 35.

Figure 7:
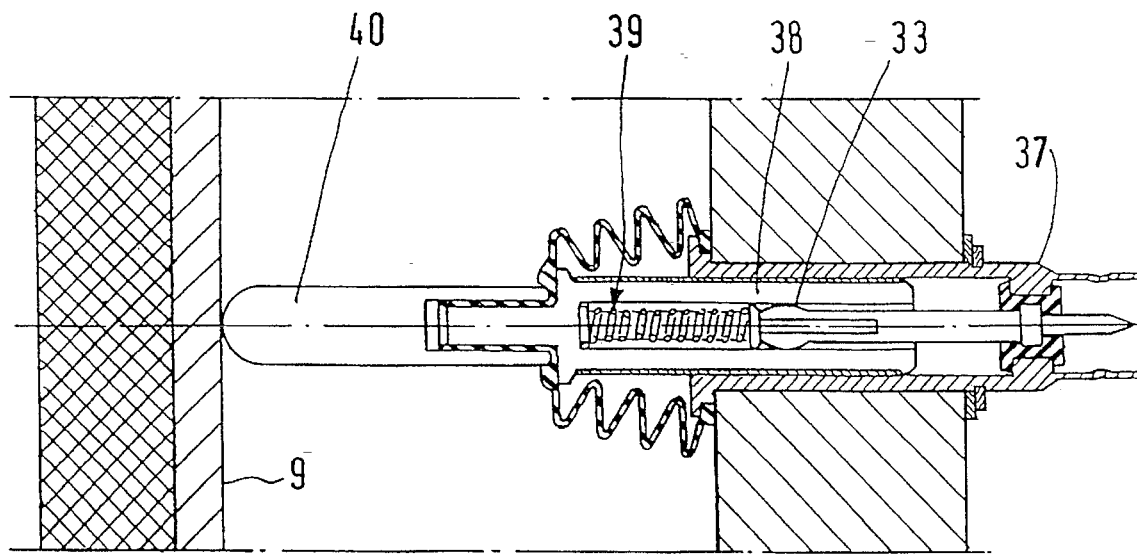
FIG. 7 is a partial sectional view of a brake in accordance with yet another embodiment of the invention.

FIG. 7 shows yet another possible embodiment variant of the capacitive sensor, which can be used simultaneously with those of FIGS. 4, 5 and 6, in which one of the electrodes of the capacitive sensor is formed by a sleeve 37 secured to the carrier or to the caliper, the other electrode comprising a slider 38 isolated from the sleeve 37, guided by it, and pushed by a spring 39 towards a friction pad 9 on which it bears by means of a feeler 40.

As the person skilled in the art will easily understand from reading the present description, the electronic circuit 18 may be mounted close to the output contacts in all the embodiments explained, and particularly illustrated in FIGS. 5, 6 and 7, in accordance with the teaching of FIG. 4.

We claim:

1. A disk brake for a motor vehicle, comprising:

first and second brake elements which can move with respect to one another, said first brake element being a caliper straddling a disk brake, said second brake element being a carrier fixed to the vehicle;

braking means comprising a cylinder secured to said caliper and facing said brake disk, said braking means having an opening closed by a piston;

guide means allowing said caliper to slide with respect to said carrier when said braking means is actuated, said guide means comprising at least one guide pin fitted to one of said first and second brake elements while the other of said first and second brake elements includes a bore in which said guide pin slides;

first and second friction pads, said first friction pad being located between said piston and a first face of said brake disk, said second friction pad being located between as second face of said brake disk and a jaw of said caliper, said first and second friction pad being applied to said brake disk on actuation of said braking means; and at least one electrical wear indicator for monitoring the state of wear of at least one of said first and second friction pads, said indicator including first and second parts at least one of which is displaced with respect to the other on actuation of said braking means, said indicator having means for varying an electrical parameter continuously as a function of the relative position occupied by said first and second parts of said indicator, characterized in that said electrical parameter is a capacitance, and that said two parts of said wear indicator constitute respective electrodes and that one of said electrodes is said guide pin and the other is a sleeve secured to said carrier, said first and second electrodes forming said guide means and having a variable overlap area, said disk brake having monitoring means being capable of periodically measuring said variable overlap area to define a current operational output signal and comparing said current operational output signal with at least one predetermined threshold for delivering a failure signal when the results of said comparison differs from a previously recorded normal result.

2. The disk brake according to claim 1 characterized in that said monitoring means comprise an electronic circuit which is sensitive to the capacitance between said first and second electrodes , said electronic circuit being secured to one of said first and second parts of said indication, said electronic circuit producing said current operational output signal, said current operational output signal being modulated over time as a function of the value of the capacitance formed between said first and second electrodes.

3. The disk brake according to claim 2, characterized in that said electronic circuit produces said current operational output signal as a modulation of an electrical energy signal received from a power source.

* * * * *